United States Patent Office 3,759,714
Patented Sept. 18, 1973

3,759,714
HIGH PROTEIN FOOD PRODUCT
Morris P. Burkwall, Jr., Barrington, Ill., assignor to The Quaker Oats Company, Chicago, Ill.
No Drawing. Filed Mar. 23, 1970, Ser. No. 22,024
Int. Cl. A23l 1/20; A23j 1/00
U.S. Cl. 99—14                                         6 Claims

ABSTRACT OF THE DISCLOSURE

A high protein food product comprising specified amounts of a flavoring agent, pregelatinized starch, a high protein binding agent, water, and either sugar, sugar equivalents, or mixtures thereof.

BACKGROUND OF THE INVENTION

Field of the invention

This invention relates to food products having a high protein content. The product is particularly suitable for human consumption but may be used as a pet food also.

Description of the prior art

Many attempts have been made to produce food products having high protein content, good taste, soft-moist texture, and good shelf stability. In each of the prior products, however, the product has either consisted of a lower protein content, a low moisture content, or else has scarificed taste in achieving the higher protein content. Also prior attempts to produce a somewhat moist high protein food product has resulted in products that require some type of aseptic packaging and/or which had a relatively short life before becoming stale or losing the desired aroma and flavor. The product herein claimed overcomes all of the deficiencies of prior products in that it is a stabile, pleasant tasting, high protein product.

SUMMARY OF THE INVENTION

It is an object of this invention to provide a high protein food product which is moist and yet which is shelf stabile at room temperature for at least six months with substantially full retention of aroma and taste.

It is another object of this invention to provide a high protein food product which is highly nutritious and which contains large amounts of protein.

It is still another object of this invention to provide a process for producing a high protein food product.

The objects of this invention are accomplished by a high protein food product comprising from about 1 percent to about 25 percent by weight flavoring agent; from about 5 percent to about 35 percent by weight of a member selected from the group consisting essentially of sugar, sugar equivalents, and mixtures thereof; from 5 percent to 30 percent by weight pregelatinized starch; from 10 percent to 50 percent by weight of a high protein binding agent; and sufficient water to give a final moisture content of from 20 percent to 40 percent by weight; wherein the total weight percentage is equal to 100 percent.

The objects of this invention are further accomplished by a process for producing a high protein food product comprising mixing from about 1 percent to about 25 percent by weight flavoring agent; from about 5 percent to about 35 percent by weight of a member selected from the group consisting essentially of sugar, sugar equivalents, or mixtures thereof; from 5 percent to 30 percent by weight pregelatinized starch; from 10 percent to 50 percent by weight of a high protein binding agent and sufficient water to give a final moisture content of from 20 percent to 40 percent by weight; wherein the total weight percentage is equal to 100 percent; then forming the mixture into the shape of a food product.

It is preferred that the high protein food product of this invention also contain from 1 percent to 7 percent by weight of an edible oil.

In the process for producing this new and novel high protein food product it is also preferred to heat the mixture to a temperature of from about 125° F. to about 210° F. and thereafter extrude the heated mixture into small strands and cut the small strands into bite-sized pieces.

The high protein food product of this invention should include from about 1 percent to about 25 percent by weight flavoring agent. This flavoring agent may be any food product that will mix with the other ingredients stated herein to adhere thereto and form a plastic mass. Among those food products which are highly acceptable for this invention are the nut butters such as peanut butter, honey, mixtures of peanut butter and honey, and candies such as chocolate and caramel. It is to be understood, however, that the flavoring agents are not limited to those above-named ingredients but also include any food material which fits the above description and which is not substantially degraded or altered by the processing conditions. The flavoring agent, therefore, would include such things as icings and food pastes and natural and synthetic flavors including those which are liquid. It would also include nonsolid food products which could be subdivided and mixed with water to form a somewhat plastic mass.

The high protein food product of this invention must include from about 5 percent to about 35 percent by weight of a member selected from the group consisting essentially of sugar, sugar equivalents, and mixtures thereof. By use herein of the term "sugar" I intend to mean any saccharide which is soluble in water to an extent that the osmotic pressure of a water solution of such a saccharide will provide the requisite bacteriostatic effect. In addition, the saccharide is required to be nontoxic. The saccharide must not provide any undesirable taste effects when used in the required concentration. It is preferred that the sugar be a low molecular weight sugar since sugars of a lower molecular weight have a more pronounced effect in increasing the osmotic pressure of a sugar solution than do sugars of a higher molecular weight. Among the sugars that may be used for this invention are the nonreducing water soluble monosaccharides; the reducing and nonreducing polysaccharides and their degradation products such as pentoses, aldopentoses, methylpentoses, ketopentoses, e.g. xylose and arabinose; rhamnose; hexoses and reducing polysaccharides; aldohexoses like glucose, galactose and mannose; the ketohexoses including fructose and sorbose; the disaccharides including maltose and lactose; the nonreducing disaccharides such as sucrose; and other polysaccharides such as dextrin and raffinose and hydrolyzed starches which contain as their constituents oligosaccharides.

By use of the term "sugar equivalents" I intend to mean a compound which can be added to the mixture to produce the same effect on osmotic pressure as would sugar. Generally the sugar equivalents include the polyhydric alcohols which are nontoxic and which do not adversely affect the taste in the concentrations specified. By the term "polyhydric alcohols" I generally intend to mean alcohols with three or more hydroxyl groups and having the general formula $HOCH_2(CHOH)_mCH_2OH$ where $m$ is a number from 1–5. Generally, these polyhydric alcohols are water soluble, have small optical rotation in water and have some sweetness to taste. Among the polyhydric alcohols that may be used in this invention are the following:

tritols:
    glycerol
tetritols:
    erythritol
    D-threitol
    L-threitol
    D,L-threitol
pentitols:
    ribitol
    xylitol
    D-arabitol
    L-arabitol
hexitols:
    allitol
    dulcitol
    sorbitol (D-glucitol)
    L-glucitol
    D,L-glucitol
    D-mannitol
    L-mannitol
    D,L-mannitol
    D-talitol
    L-talitol
    D,L-talitol
    D-iditol
    L-iditol
heptitols:
    glycero-gulo-heptitol
    D-glycero-D-ido-heptitol
    perseitol
    volemitol
octitol:
    D-erythro-D-galacto-octitol.

The term sugar equivalent also includes the higher sugar alcohols. Glycerol and propylene glycol are acceptable "sugar equivalents" and are particularly useful in this invention. As used herein, the product should contain sugar or a sugar equivalent or mixtures thereof. When using mixtures of the sugar and sugar equivalents, care must be taken to insure that the amount used reduces the osmotic pressure of the product to the extent that it imparts therein a bacteriostatic effect.

The product of this invention contains from 5 percent to 30 percent by weight pregelatinized starch. Any of the common commercial starches are acceptable for use in this invention. I have found it particularly acceptable to use a pregelatinized tapioca starch, but this invention is not limited to tapioca as the only type of starch since other types of starch such as corn starch, wheat starch, waxy maize starch, etc. are also acceptable.

By use of the term "pregelatinized" with reference to the starch, I intend to mean starch that is gelatinized prior to addition to the mix or else is partly or slightly gelatinized prior to addition to the mix and then gelatinized by the processing conditions.

The high protein food product of this invention also includes from 10 percent to 50 percent by weight of a high protein binding agent. The high protein binding agent should have a protein content which when combined with the protein content of the other ingredients provides at least from about 20 to 25 percent by weight protein in the finished product. It is generally preferred to use as a binding agent a soybean flour which has been concentrated to provide in the flour at least 50 percent by weight protein. Any of the known high protein binding agents may be used in place of the soy flour, however, including such things as casein, caseinate salts, albumin, and whey. Also acceptable as protein binding agents are non-fat milk solids, cereal proteins such as wheat gluten and corn zein, and the common oilseed proteins.

The high protein food product of this invention contains from 20 percent to 40 percent by weight water as a final moisture content. Although the water content of this product would generally be expected to result in serious bacterial problems, this has been essentially eliminated by the use herein of the sugar, sugar equivalents, and mixtures thereof to provide a bacteriostatic effect.

In addition to the fat that is already present in the ingredients it may be desirable to add an additional 1 percent to 7 percent by weight of an edible fat or oil to increase the fat content of the product. The term "edible fat or oil" as used herein refers to the common usage of the term including those that are solid and those that are liquid at room temperature.

Depending upon the intended use of the product various other standard food additives may be desirable in order to provide certain color, flavor, nutritional, or texture characteristics or to assist in the preservative action.

The process for producing my new and unique high protein food product comprises mixing from about 1 percent to about 25 percent by weight flavoring agent; from about 5 percent to about 35 percent by weight of a member selected from the group consisting essentially of sugar, sugar equivalents, and mixtures thereof; from 5 to 30 percent by weight pregelatinized starch; from 10 percent to 50 percent by weight of a high protein binding agent; and sufficient water to bring the final moisture content to form 20 percent to 40 percent by weight; and forming the mixture into the shape of a food product. In preparing this product it is essential that the mixing of the ingredients be sufficiently thorough so that each of the ingredients will be uniformly distributed throughout the product. The mixture can then be formed into any desired food shape. For instance, the product can be extruded into small strands and then cut into bite-sized shape.

I have found it is particularly acceptable to produce a food product by miving the ingredients together, heating the mixture to a temperature of from about 125° F. to about 210° F. and thereafter extruding the heated mixture into small strands. While higher extrusion temperatures may be used to give an acceptable product, such is not the preferred conditions since the higher temperatures tend to cause a loss of the volatile aroma and flavor components of the added flavoring agent.

DESCRIPTION OF THE PREFERRED EMBODIMENTS

The following examples may be taken to constitute the preferred embodiments of this invention although the invention is not limited to the embodiments illustrated.

EXAMPLE 1

The following ingredients were admixed (parts refers to parts by weight):

5 parts flavoring agent (2.5 parts peanut butter, 2.5 parts honey)
18 parts sugar and sugar equivalent (13 parts sucrose, 5 parts glycerol)
16 parts pregelatinized tapioca starch
23 parts high protein binding agent (17 parts of 50% protein soy flour, 5 parts sodium caseinate, 1 part dried whey)
0.3 part potassium sorbate
28 parts water.

After the ingredients were thoroughly mixed, the mixture was placed in an extruder wherein the mixture was heated to about 150° F., and the heated mixture was then extruded into small strands. The small strands of food product were highly acceptable in taste and other characteristics.

EXAMPLE 2

Example 1 was repeated except the peanut butter-honey mixture was replaced by 5 parts honey. A good product was produced.

EXAMPLE 3

Example 1 was repeated except the peanut butter-honey mixture was replaced by 10 parts chocolate. A good food product was produced.

The particular advantages of the product of this invention are numerous. First, the product is shelf stabile at room temperature for up to six months with substantially full retention of aroma and taste. While some food products have a certain degree of shelf stability, none of them approach the product of this invention for stability with substantial retention of aroma and taste.

Another important advantage of this product is that it is a highly nutritious and high protein containing product which can supply the dietary requirements of humans or pets at a low cost.

Having fully defined my new and unique invention, I claim:

1. A shelf stable high protein food product containing from about 20-25% by weight protein, comprising from about 1 percent to about 20 percent by weight of a flavoring agent; from about 5 percent to about 35 percent by weight of a member selected from the group consisting essentially of sugar, sugar equivalents, and mixtures thereof; from 5 percent to 30 percent by weight pregelatinized starch; from 10 percent to 50 percent by weight of a high protein binding agent; and sufficient water to give a final moisture content of from 20 percent to 40 percent by weight; wherein the total weight percentage of the product is 100 percent.

2. A food product as in claim 1 wherein the flavoring agent comprises about 5 percent by weight peanut butter and about 5 percent by weight honey.

3. A food product as in claim 1 wherein the flavoring agent comprises about 10 percent by weight honey.

4. A food product as in claim 1 wherein the flavoring agent comprises about 5 percent by weight chocolate.

5. A food product as in claim 1 which also includes from 1 percent to 15 percent by weight of an edible oil.

6. A process for producing a shelf stable high protein food product containing from about 20-25% weight protein, comprising mixing: from about 1 percent to about 20 percent by weight of a flavoring agent; from about 5 percent to about 35 percent by weight of a member selected from the group consisting essentially of sugar, sugar equivalent, and mixtures thereof; from 5 percent to 50 percent by weight pregelatinized starch; from 10 percent to 30 percent by weight of a high portein binding agent; and sufficient water to give a final moisture content of from 20 percent to 40 percent by weight; wherein the total weight percentage of the product is 100 percent; and thereafter forming the mixture into the shape of a food product.

References Cited
UNITED STATES PATENTS

| | | | |
|---|---|---|---|
| 3,100,909 | 8/1963 | Schapiro | 99—78 |
| 3,431,112 | 3/1969 | Durst | 99—1 |
| 3,434,843 | 3/1969 | Durst | 99—1 |

RAYMOND N. JONES, Primary Examiner

U.S. Cl. X.R.

99—2, 17, 19, 20

UNITED STATES PATENT OFFICE
CERTIFICATE OF CORRECTION

Patent No. 3,759,714     Dated September 18, 1973

Inventor(s) Morris P. Burkwall

It is certified that error appears in the above-identified patent and that said Letters Patent are hereby corrected as shown below:

Claim 6, column 6, line 15 "to 30 percent" should be --to 50 percent--.

Signed and sealed this 1st day of January 1974.

(SEAL)
Attest:

EDWARD M. FLETCHER, JR.          RENE D. TEGTMEYER
Attesting Officer                 Acting Commissioner of Patents